US009338210B2

(12) United States Patent
Jain et al.

(10) Patent No.: US 9,338,210 B2
(45) Date of Patent: May 10, 2016

(54) DISTRIBUTING CONTENT ITEMS TO USERS (71) Applicant: Rhapsody International Inc., Seattle, WA (US)

(72) Inventors: Nishant Jain, Sunnyvale, CA (US); Darryl William Wood, Tacoma, WA (US)

(73) Assignee: RHAPSODY INTERNATIONAL INC., Seattle, WA (US)

( * ) Notice: Subject to any disclaimer, the term of this patent is extended or adjusted under 35 U.S.C. 154(b) by 400 days.

(21) Appl. No.: 13/832,372

(22) Filed: Mar. 15, 2013

(65) Prior Publication Data

US 2014/0281003 A1    Sep. 18, 2014

(51) Int. Cl.
*G06F 15/16* (2006.01)
*H04L 29/06* (2006.01)

(52) U.S. Cl.
CPC .......... *H04L 65/607* (2013.01); *H04L 65/4084* (2013.01); *H04L 65/602* (2013.01)

(58) Field of Classification Search
CPC .............................. H04N 7/173; H04L 65/607
See application file for complete search history.

(56) References Cited

U.S. PATENT DOCUMENTS

| 7,945,573 | B1 | 5/2011 | Barnes et al. |
| 2004/0268400 | A1 | 12/2004 | Barde et al. |
| 2011/0307929 | A1* | 12/2011 | Youssefmir et al. ............ 725/89 |
| 2014/0068097 | A1* | 3/2014 | Redelinghuys ................ 709/231 |
| 2014/0119428 | A1* | 5/2014 | Catchpole et al. ........ 375/240.02 |
| 2014/0143823 | A1* | 5/2014 | Manchester et al. ........... 725/116 |
| 2014/0297813 | A1* | 10/2014 | Gomes et al. ................. 709/219 |

OTHER PUBLICATIONS

Strufe, Thorsten, "IlmStream: Efficient Multimedia Streaming in decentralised distributed systems," Proceedings of the World Automation Congress, 2004.
Lamboray, et al., "Interactive multimedia streams in distributed applications," Computers & Graphics, vol. 27, Issue 5, Oct. 2003, pp. 735-745.
Itaya, Satoshi, "Distributed coordination for scalable multi-source multimedia streaming model," 12th International Conference on Parallel and Distributed Systems (ICPADS), 2006.

* cited by examiner

*Primary Examiner* — Nicholas Taylor
*Assistant Examiner* — Sanjoy Roy
(74) *Attorney, Agent, or Firm* — K&L Gates LLP (57) ABSTRACT Systems and methods for providing content items to users. A first content item is divided into an opening portion and a remainder portion. The opening portion begins at a chronological beginning of the first content item and ends a predetermined number of digital units from the chronological beginning of the first content item. The opening portion may be encoded according to an encoding format. The opening portion may be stored at a first remote data storage location. In response to a request for the content item from a user device, the first remote data storage location is instructed to stream the opening portion to the user device. The remainder portion may be encoded according to the encoding format and streamed to the user device.

8 Claims, 11 Drawing Sheets

DISTRIBUTING CONTENT ITEMS TO USERS

BACKGROUND

This application generally relates to distributing content items, such as audio tracks, to users.

A proliferation of content provider services gives users access to all types of digital content including, music, movies, books, etc. Typically, a content provider service obtains license rights to a library of digital content. A user subscribes to the content provider service to receive content items, either individually or bundled together (e.g., by genre) via a stream. Users receive the content items via various different types of user devices including, for example, mobile devices, other computers, network-enabled stereo receivers, etc. Users are charged according to many different types of payment methodologies including, for example, periodic subscription charges, charges by content item, charges by unit time, etc. Traditional search engines and similar tools allow users to search libraries of available content to find content items for viewing, listening and/or downloading.

DRAWINGS

Various example embodiments are described herein by way of example in conjunction with the following figures, wherein.

DESCRIPTION

Various example embodiments are directed to systems and methods for distributing content items to users, for example, while minimizing the amount of data stored at disparate storage locations, such as content distribution networks. Under common practice, content provider services utilize one or more content distribution networks to distribute content items to users. The content provider service uploads copies of all or a portion of its digital content library to the content distribution network. The content distribution network subsequently stores the digital content library at a number of distributed mirror sites. When a user requests a content item, the content provider service instructs the content distribution network to transmit (e.g., stream) the content item to the user. The content distribution network selects the mirror site that is closest to the user geographically and/or according to network topography and streams the content item to the user from the selected mirror site.

This procedure allows users to receive content items in a reliable manner without undue delay. However, it also adds considerable operating expenses for the content provider services. Most commercially available content distribution networks charge content provider services based on the total size of the digital content items stored. Accordingly, the content provider service's distribution expenses increase with the size of its digital content library, often regardless of how often individual content items are accessed. Also, many content provider services support different user device clients that expect to receive content items according to different encoding formats. Therefore, it is often necessary to pay for the storage of multiple copies of some or all of the content items, with different copies corresponding to different encoding formats.

According to various example embodiments, commercial content distribution network costs are minimized by dividing content items into opening portions and remainder portions. The opening portions comprise a predetermined number of digital units representing the beginning of the content item playback such as, for example, the first thirty (30) seconds of content item playback. The opening portions are pushed to a content distribution network while the remainder portions are stored at a system associated with the content provider service (e.g., a system where storage is less expensive than at the content distribution). When a user requests a content item, the content provider service instructs the mirror site to begin streaming the opening portion of the content item to the user. The content provider service also begins streaming the remainder portion to the user. Due to the nature of the content distribution network, the stream of the opening portion may arrive at the user device relatively quickly. The stream of the remainder portion may be arrive later. The user device (e.g., a client executing on the user device) may be configured to begin playback of the content item upon receiving the stream of the opening portion. When the stream of the remainder portion is received, the client stitches the opening portion and the remainder portion together. The size of the opening portion may be selected such that the stream of the remainder portion is received and stitched to the opening portion before playback of the content item reaches the end of the opening portion. Because only the opening portion is stored with the content distribution network, the associated distribution costs for the content provider service may be greatly reduced.

Reference will now be made in detail to several example embodiments, examples of which are illustrated in the accompanying figures. Wherever practicable, similar or like reference numbers may be used in the figures and may indicate similar or like functionality. The figures depict example embodiments of the disclosed systems (or methods) for purposes of illustration only. One skilled in the art will readily recognize from the following description that alternative example embodiments of the structures and methods illustrated herein may be employed without departing from the principles described herein.

Figure 1:
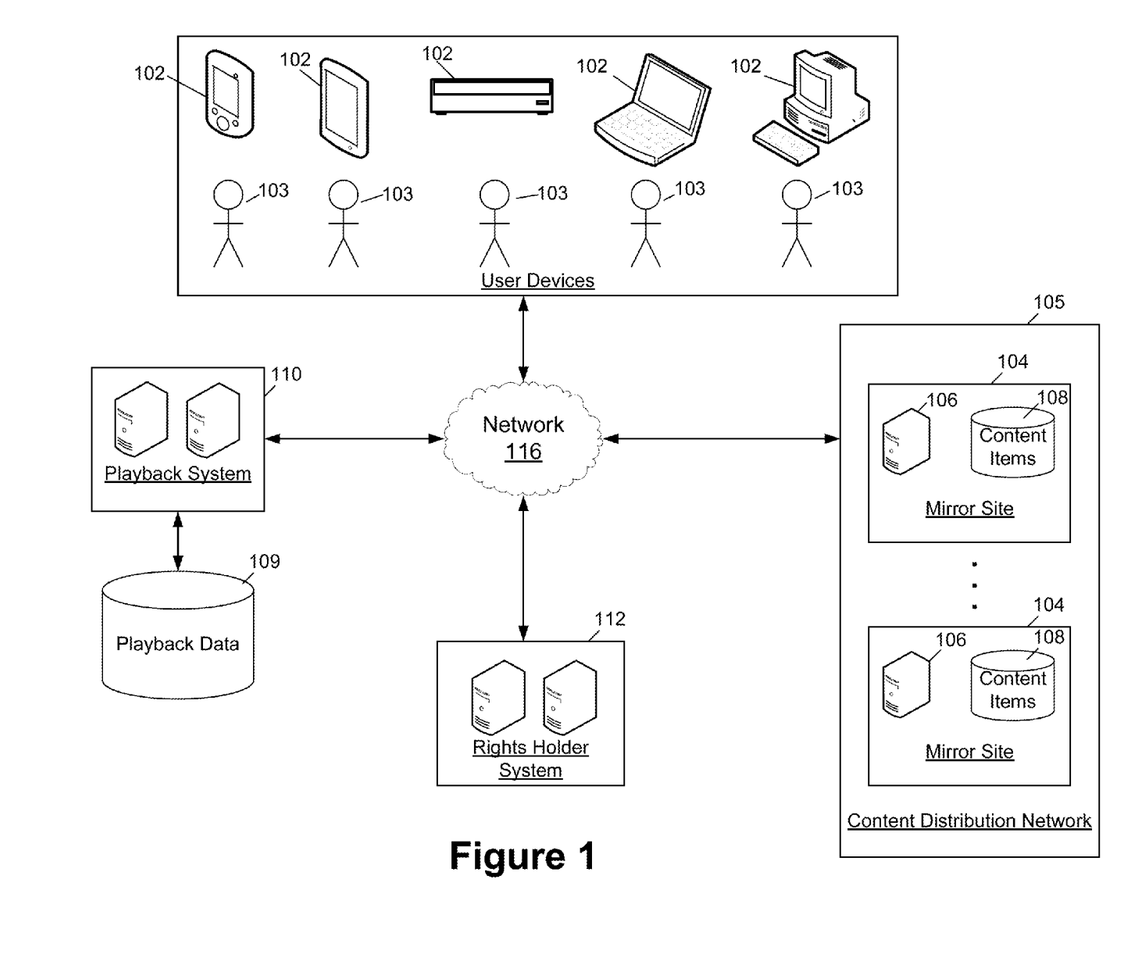
FIG. 1 is a block diagram showing one example embodiment of an environment for implementing systems and methods for distributing content items to users.

FIG. 1 is a block diagram showing one example embodiment of an environment 100 for implementing systems and methods for distributing content items to users. The environment 100 comprises one or more playback systems 110, one or more rights holder systems 112, one or more content distribution networks 105, one or more outside information systems 113, and a plurality of user devices 102. Each user device 102 may be associated with a user 103. For example, a user 103 may own, lease, or otherwise have rights to use his or her associated user device 102. The user devices 102 may receive various content items and/or user interfaces from and/or through other sites 105, 110 of the environment 100 and provide the content items to the associated user 103, for example, as described herein. User devices 102 may comprise any type of network-enabled computer device that may be utilized by a user to receive and/or view content items. Examples of user devices include smart phones, tablet computers, laptop computers, desktop computers, network-enabled stereo receivers, etc. In some example embodiments, each user 103 is associated with a subscription account to one or more content provider services. It will be appreciated, however, that subscription accounts may be associated with user devices 102 in addition to or instead of being associated with users 103. In some example embodiments, subscription accounts may be associated with a geographic location or area, for example, the primary geographic location or area from which the user 103 and/or user device 102 contacts the playback system 110, as described herein.

Content provider services may be embodied by one or more playback systems 110, which may operate in conjunction with one or more content distribution networks 105. The playback system 110 may receive a request for a content item from a user 103 (e.g., via a user interface). The playback system 110 may authenticate the user 103 and/or associated user device 102 to determine that the user 103 and/or the user device 102 has an active subscription that entitles the user 103 (and/or device 102) to access the requested content item. Provided that the authentication is successful, the playback system 110 may cause the requested content item to be provided to a user device 102 associated with the requesting user 103. For example, the playback system 110 may request that the content item be transmitted to the user device 102 by a content distribution network 105. Content items may be transmitted from the content distribution network 105 (e.g., a mirror site 104 thereof) to a user device 102 in any suitable manner. For example, the content items may be transmitted via a secure communication channel formed between the mirror site 104 and the user device 102 such as a transport layer security (TLS) or secure socket layer (SSL) channel. Also, for example, some content items may be individually encrypted during communication or transmitted in the clear. It will also be appreciated that content items may be provided to user devices 102 as discrete files or units or as part of a stream of content.

The playback system 110 may be programmed to implement various tools allowing users 103 to search available content items provided via a user interface. Examples of such tools may include search engines, play lists and radio stations. Search engines allow users 103 to locate content items according to any suitable searching methodology such as, for example, key word searches, searches by genre, searches by content item type, etc. Play lists may be lists of content items, for example, stored at playback systems 110. A play list may be created automatically, created by editorial staff of the content service provider and/or created based on input from a user device 102. Play lists may be available to all users 103, only to originating users 103, to select users 103, etc. In some example embodiments, users 103 have associated user play lists. User play lists can be play lists that the user 103 generated and/or selected to be associated with the user's account. In some example embodiments, user play lists may be selected and associated with a user's account automatically (e.g., by the playback system 110). A radio station may comprise a flow of content items generated, for example, by a playback system 110 and, for example, streamed to one or more users. The content items making up a radio station flow may be repeated and/or continuously updated (e.g., by the playback system 110). Specific content items may be included in a radio station flow or may be selected based on one or more common characteristics (e.g., similarity to a set of user selected content items, a common genre, a common artist, a common theme, etc.). In addition to indications of content items, user play lists may also include indications of radio station flows.

In some example embodiments, the playback system 110 comprises a data store 109. The data store 109 stores data including, for example, some or all of the digital content library including, for example, the remainder portions, as described herein. In some example embodiments, the playback system 110 partially or completely provides the content items directly to the users 103 thus replacing some or all of the functionality of the mirror sites 104. In some example embodiments, the data store 109 also comprises a user database that includes data describing various users 103 including, for example, user play lists associated with users.

The content distribution network 105 may comprise one or more distributed mirror sites 104. Each site 104 may comprise one or more data stores 108 comprising content items and a server or other computer device 106 for processing requests. The mirror sites 104 may be mirrors of one another located at disparate geographic and/or network locations. For example, the content distribution network 105 may balance the loads of various mirror sites 104 by directing requests to transmit content items to different mirror sites 104 based on geographic and/or network proximity between the requesting user device 102 and the various mirror sites 104, loads on the mirror sites 104, etc. In some example embodiments, the content distribution network 105 may be administered by a third-party vendor of the content provider service such as, for example, LIMELIGHT NETWORKS.

In some example embodiments, the environment 100 also comprises one or more rights holder systems 112. Rights holder system 112 may be associated with entities that hold the rights (e.g., copyright, trademark, etc.) in content items making up the digital content library. Rights holder systems 112 may provide digital content items to the playback system 110 and/or content distribution system(s) 104. In some example embodiments, rights holder systems 112 also indicate to the playback system 110 digital content that is to be removed from the digital content library including, for example, digital content items for which license rights have expired, digital content items that are being re-released in another form, etc.

The various components 102, 104, 105, 110, 112, etc. of the environment 100 may communicate with one another via a network 116. The network 116 may be any suitable type of wired, wireless, or mixed network and may comprise, for example, the Internet, a local area network (LAN), a wide area network (WAN), etc. In some example embodiments, some or all of the functionality for implementing a content provider service may be consolidated in a single system. For example, any combination of the playback system 110 and/or the content distribution network 105 or various mirror sites 104 may be consolidated into one or more single systems (e.g., at a common geographic location).

Figure 2:
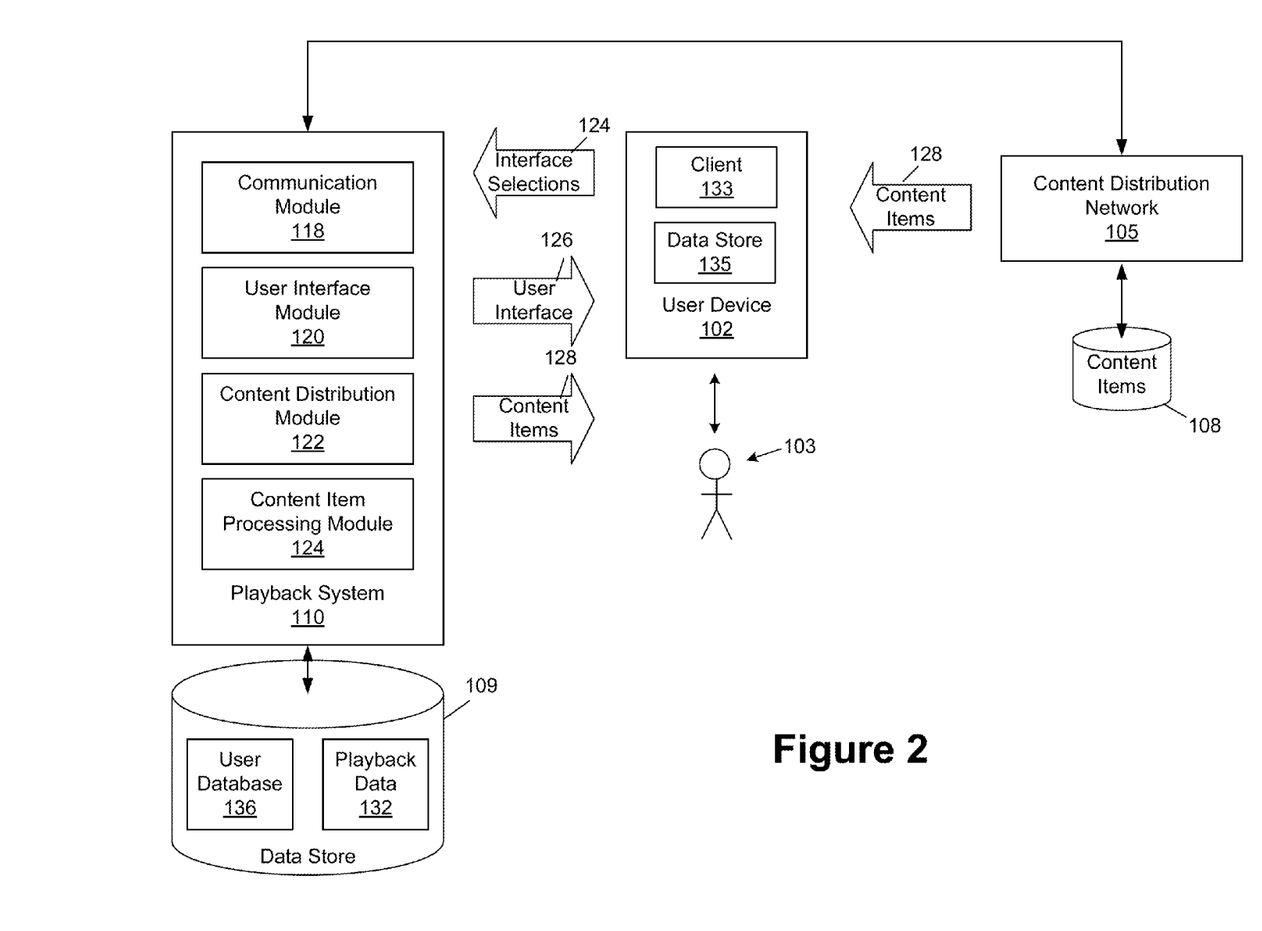
FIG. 2 is a block diagram showing one example embodiment of a playback system in communication with a user device and a content distribution network.

FIG. 2 is a block diagram showing one example embodiment of a playback system 110 in communication with a user device 102 and a content distribution network 105. The playback system 110 is programmed to execute example functional modules 118, 120, 122, 124. A communication module 118 may be programmed to facilitate communication between the playback system 110 and various other components of a content provider service such as, for example, the content distribution network 105, rights holder systems 112, etc. A user interface module 120 may be programmed to generate a user interface 126 and provide the interface 126 to users 103 (e.g., via the associated user devices 102). The interface 126 may provide the users 103 with indications of available content items. In some example embodiments, the interface 126 may provide the users 103 with indication of user play lists from which the users may select content items for streaming and/or download. The user 103 may select one or more content items, for example, via selections 124 made through the user interface 126. In response, the playback system 110 may initiate the provision of the selected content items 132 to the user device 102.

A content distribution module 122 may facilitate the distribution of the selected content items. For example, the content distribution module 122 may instruct the content distribution network 105 (e.g., via the communication module 118) to provide the content items 132 (or opening portions thereof) to the user 103. Also, in some example embodiments, the content distribution module 122 may distribute content items 132 directly from the playback data store 109 to the user 103 (e.g., remainder portions thereof). A content item processing module 124 may receive content items from various rights holder systems 112 and process the content items 128 for provision to users 103. For example, the content item processing module 124 may be configured to condition content items 128, encode content items 128 according to various encoding formats, divide content items into opening and remainder portions, etc., as described herein.

In some example embodiments, the playback data store 109 comprises various databases 134, 136 comprising data used by the playback system 110. A user database 136 comprises various data describing users of the content provider service implementing the playback system 110. Such data may include, for example, account data, log-in information, usage logs, etc., and may be used to authenticate or log the user 103 into the content provider service implemented, at least in part, by the playback system 110. In various example embodiments, the user data stored at the user database 136 also comprises user play lists including user play list generated by a user 103, provided to the user 103 by another user 103, assigned to the user by the content provider service, etc. A content item store 132 may comprise content items to be provided to the user 103 directly through playback system 110 (e.g., not through the content distribution network 105. For example, the content item store 132 may comprise remainder portions of content items 128.

The example user device 102 shown in FIG. 2 comprises a client 133 for facilitating communication with the playback system 110. The client 133 may facilitate communications with the playback system 110. For example, the client 133 may receive and display the user interface 126 from the playback system 110 and receive and transmit interface selection 126 from the user 103. The client 133 may also be programmed to stitch content item opening portions and remainder portions during playback, as described herein. In some example embodiments, the user device 102 may also comprise data storage 135 for storing comprise locally stored user play lists, downloaded content items, etc.

Figure 3:
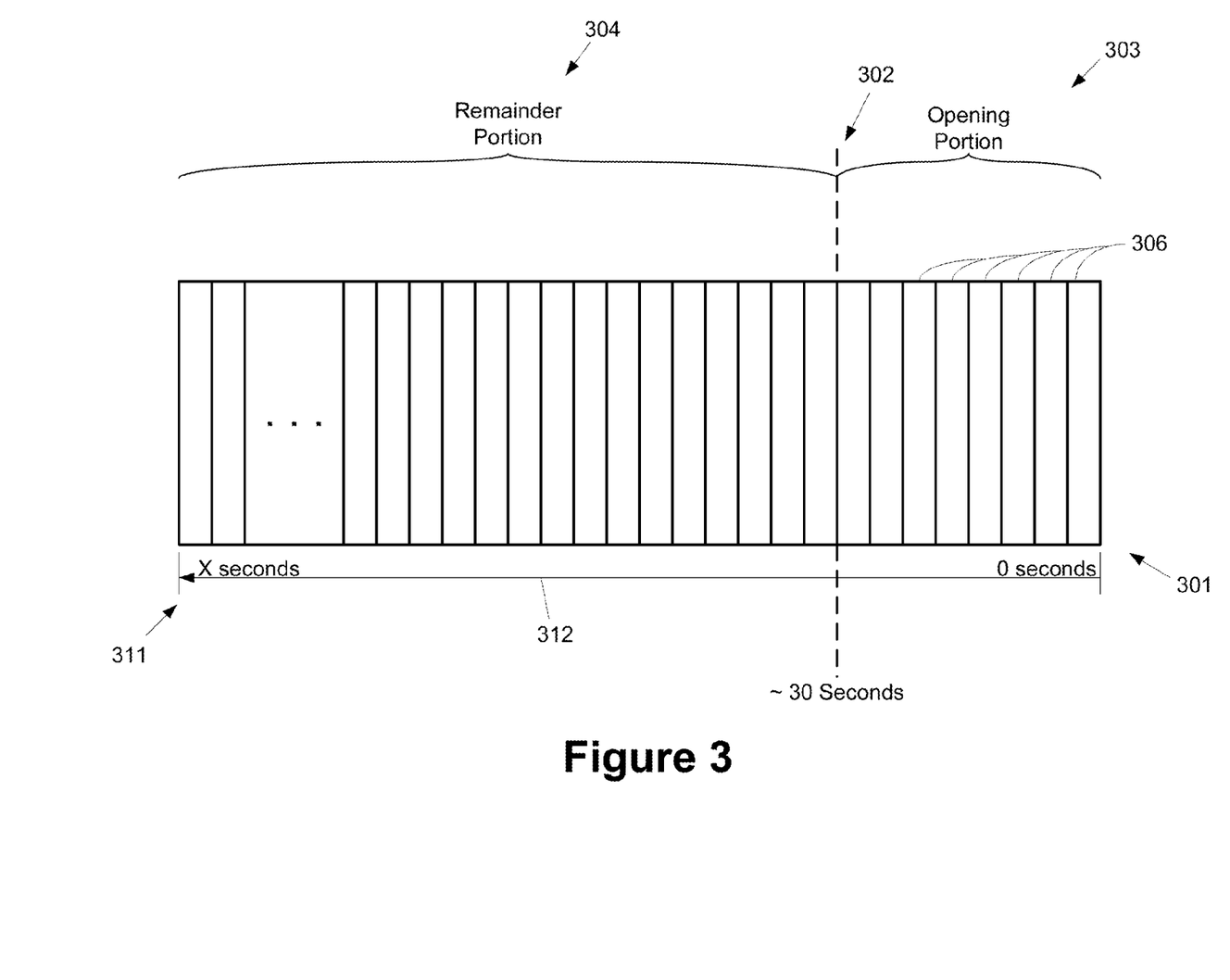
FIG. 3 is a block diagram showing one example embodiment of a content item illustrating how the content item may be divided into opening and remainder portions.

According to various example embodiments described herein, the playback system 110 or other component of the content provider service divides content items, distributing the opening portions of the content items through a content distribution network 105 and the remainder portion of the content items according to an alternate distribution method. FIG. 3 is a block diagram showing one example embodiment of a content item 300 illustrating how the content item 300 may be divided into opening and remainder portions. The content item 300 is comprised of a plurality of digital units 306. The digital units 306 may corresponds to any suitable unit of data including, for example, bits, bytes, etc. The digital units 306 are logically arranged in playback order from a chronological beginning of the item 301 to a chronological end of the item 311. The logical order of the digital units 306 corresponds to a playback of the content item 300, as illustrated by playback axis 312. The playback axis 312 indicates positions of the playback of the content item 300 in units of time (e.g., seconds). The chronological beginning 301 comprises a first digital unit 306 corresponding to zero seconds in the content item playback. Digital units 306 corresponding to progressively later portions of the content item playback are positioned to the left.

To divide the content item 306, the playback system 110 selects a breakpoint 302. The opening portion 303 of the content item 300 comprises digital units 306 logically positioned before the breakpoint 302 according to the axes 312. The remainder portion 304 of the content item 300 comprises digital units 306 logically positioned after the breakpoint 302. The breakpoint 302 may be set to digital unit 306 at a logical position corresponding to a predetermined playback time (e.g., approximately 30 seconds into the content item playback). Digital units 306 that are logically positioned before the breakpoint 302 are part of the opening portion 303, while digital units 306 that are logically positioned after the breakpoint 302 are part of the remainder portion. Accordingly, in the illustrated content item, the opening portion 303 corresponds to about 30 seconds of the content item playback.

The position of the breakpoint 302, and therefore the size and playback time of the opening portion 303, may be selected in any suitable manner. For example, it will be appreciated that the stream of the opening portion 303, provided by a content distribution network 105, may arrive at a user device 102 sooner than the stream of the remainder portion. In some embodiments, the playback system 110 selects the playback time associated with the opening portion 303 so that the remainder portion 304 stream is received and stitching is complete before playback of the opening portion 303 is complete. In this way, the user 103 may not experience any pause in the content item playback.

It will be appreciated that the content item 300 may comprise and/or be associated with additional metadata describing properties of the content item. Some example embodiments of the content item 300 comprise a metadata header positioned at a logical head of the content item 300 (e.g., logically before the zero playback point). The playback system 110 may deal with a header or other metadata portion of the content item 300 in any suitable manner. For example, in some example embodiments, the metadata may be associated with the opening portion 303. The breakpoint 302 may be positioned to include in the opening portion the metadata and additional digital units 306. The position of the breakpoint 302 in the playback of the content item, however, may be determined by digital units 306 that are not part of the header.

Figure 4:
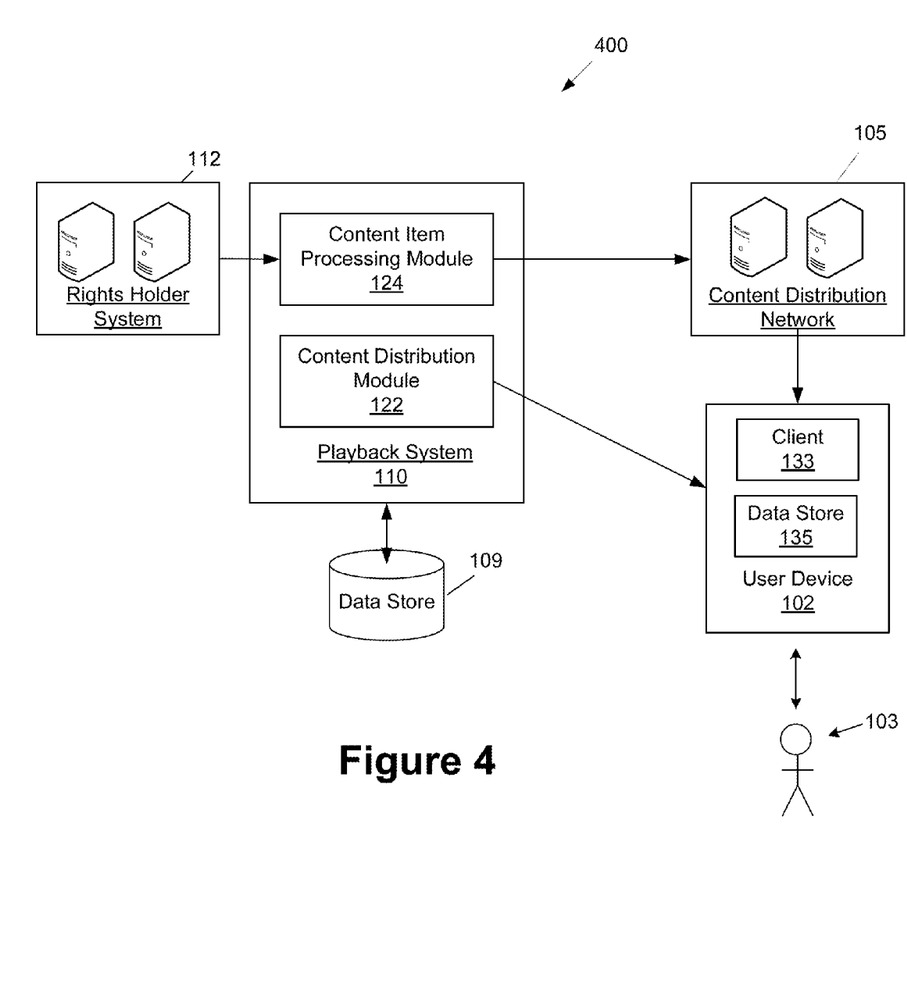
FIG. 4 is a block diagram illustrating one example embodiment of a process for receiving content items and providing the content items to content provider service users.
Figure 5:
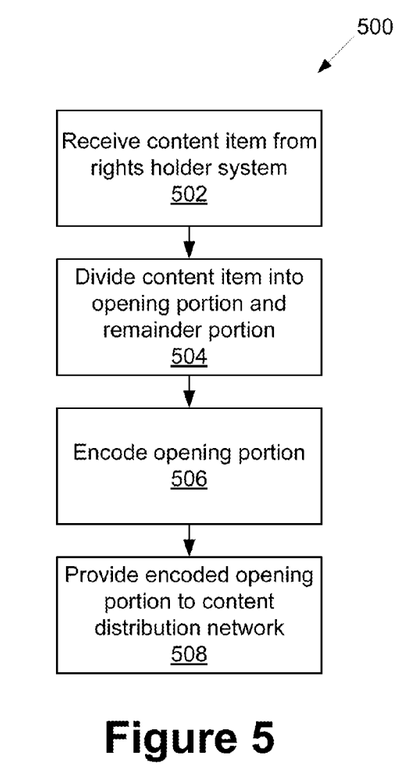
FIG. 5 is a flow chart illustrating one example embodiment of a process flow for receiving and processing content items in conjunction with the block diagram of FIG. 4.

FIG. 4 is a block diagram 400 illustrating one example embodiment of a process for receiving content items and providing the content items to content provider service users. FIG. 5 is a flow chart illustrating one example embodiment of a process flow 500 for receiving and processing content items in conjunction with the block diagram 400 of FIG. 4. Referring to FIGS. 4 and 5, the playback system 110 may receive a content item from the rights holder system 112 at 502. The content items may be received in any suitable format. For example, audio content items may be received as WAV files (*.wav), Windows Media files (*.wma), free lossless audio codec (*.flac), advanced audio coding of various bit-rates (*.aac), MPEG-1 or MPEG-2 audio layer III (*.mp3), etc. In various example embodiments, the playback system 110 (e.g., the communications module 118 and/or content processing module 124 thereof) may operate a file transfer protocol (FTP) server or service or use any other suitable mechanism to receive the content item.

At 504, the playback system 110 (e.g., the content item processing module 124 thereof) divides the received content item into an opening portion and a remainder portion. The opening portion, as described with respect to FIG. 3, may begin at a chronological beginning of the first content item and end a predetermined number of digital units from the chronological beginning. The remainder portion may comprise the rest of the content item that is not a part of the opening portion. The size of the opening portion may be determined in any suitable manner. In some example embodiments, the content processing module 124 may estimate a delay between when a requesting user device 102 will receive a first stream comprising the opening portion and when the requesting user device 102 will receive a second stream comprising the remainder portion. The opening portion size, then, may be selected as a predetermined number of digital units corresponding to a playback time of the content item that is equal to or greater than the delay. In some embodiments, the content processing module 124 may also consider a time necessary for encoding the remainder portion. For example, the delay between the first and second streams may comprise a communications delay as well as a time for encoding the remainder portion.

At 504, content item processing module 124 encodes the opening portion of the content item. In some example embodiments, this may involve processing the content item utilizing an "encoding farm" or a number of servers or other computer hardware items that are configured to encode content items. For example, the encoding farm may be part of the playback system 110. The opening portion may be encoded into any suitable encoding format including, for example, those indicated above. At 508, the playback system 110 provides the encoded opening portion to the content distribution network 105. The remainder portion may remain un-encoded and may be stored, for example, at the data store 109. Although the process flow 500 is described in the context of a single content item, it will be appreciated that the playback system 110 may receive and process multiple content items in the described manner concurrently. Different content items may be encoded according to different encoding formats.

Also, in some example embodiments, each content item, or opening portion thereof, may be encoded into multiple different encoding formats, with versions of the opening portion in each encoding format being provided to the content distribution network 105. In this way, the playback system 110 and content distribution network may support different clients 133 according to different encoding formats. In some example embodiments, the playback system 110 may encode the remainder portion before storing at the data store 109. It will be appreciated that this may allow the playback system 110 to provide the remainder upon request without first having to encode it.

Figure 6:
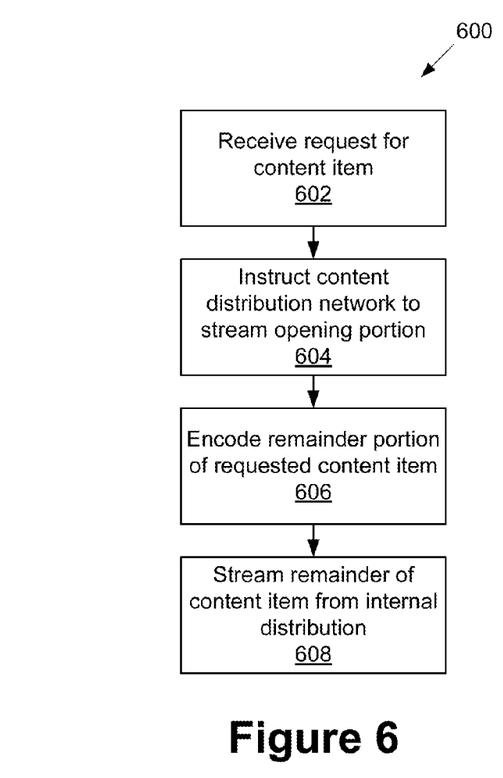
FIG. 6 is a flow chart illustrating one example embodiment of a process flow for receiving and processing content item requests in conjunction with the block diagram of FIG. 4.

FIG. 6 is a flow chart illustrating one example embodiment of a process flow 600 for receiving and processing content item requests in conjunction with the block diagram 400 of FIG. 4. At 602, the playback system 110 (e.g., the content distribution module 122 thereof) may receive a request for a content item. The request may originate from a user device 102 associated with a user 103 and, for example, from a client 133 executing on the user device 102. In some example embodiments, the playback system 110, upon receiving the request, authenticates the user 103 and/or checks the user's subscription status. At 604, the playback system may instruct the content distribution network 105 to begin distributing the requested content item to the user device 102. In some example embodiments, the instruction to the content distribution network 105 includes an indication of a desired delivery encoding format. The delivery encoding format indicates the encoding format in which the content item should be delivered to the user device 102. Upon instruction, the content distribution network 105 may begin streaming the opening portion of the content item to the user device 102, for example, according to the indicated encoding format.

At 606, the playback system (e.g., the content distribution module 122 thereof) encodes the remainder of the requested content item. In some example embodiments, the encoding is performed utilizing the encoding farm referenced herein above. Upon completion of the encoding, the content distribution module 122 may begin to stream the remainder portion of the requested content item to the user device at 608. In some example embodiments, the playback system 110 may have encoded the remainder portion at the time it was divided from the opening portion. Accordingly, action 606 may be omitted. Also, although the process flow 600 pertains to a single content item request, it will be appreciated that the actions shown in the process flow 600 may be repeated to respond to additional content item requests from the same user device 102 or different user devices 102.

Figure 7:
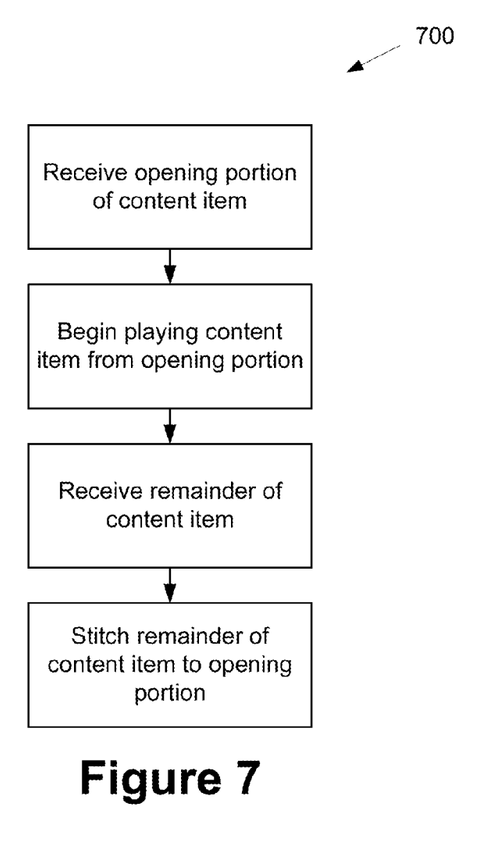
FIG. 7 is a flow chart illustrating one example embodiment of a process flow that may be executed by a user device to receive, stitch and play the opening and remainder portions of the requested content item.

FIG. 7 is a flow chart illustrating one example embodiment of a process flow 700 that may be executed by a user device 102, for example a client 133 thereof, to receive, stitch and play the opening and remainder portions of a requested content item. At 702, the user device 102 begins receiving the stream of the opening portion of the requested content item from the content distribution network 105, for example, from a selected mirror site 104 thereof. The opening portion, as it is received, is progressively stored to a memory location. At 704, the client 133 of the user device 102 begins playback of the requested content item from the memory location. The playback begins at a chronological beginning of the content item, which may be the logical beginning of the memory location. At 706, the user device 102 begins receiving the stream of the remainder of the requested content item. At 708, the client 133 of the user device 102 may stitch the opening portion and remainder portion of the requested content item together. For example, the stitching may involve progressively storing the remainder portion, as it is received, to the memory location. Storing of the remainder portion may begin at an offset position, as described below. For example, the end of the opening portion and the beginning of the remainder portion may be logically adjacent. The stitching may be completed before the playback reaches the split between the opening and remainder portions. In this way, the user device 102 may playback the requested content item without interruption.

Figure 8:
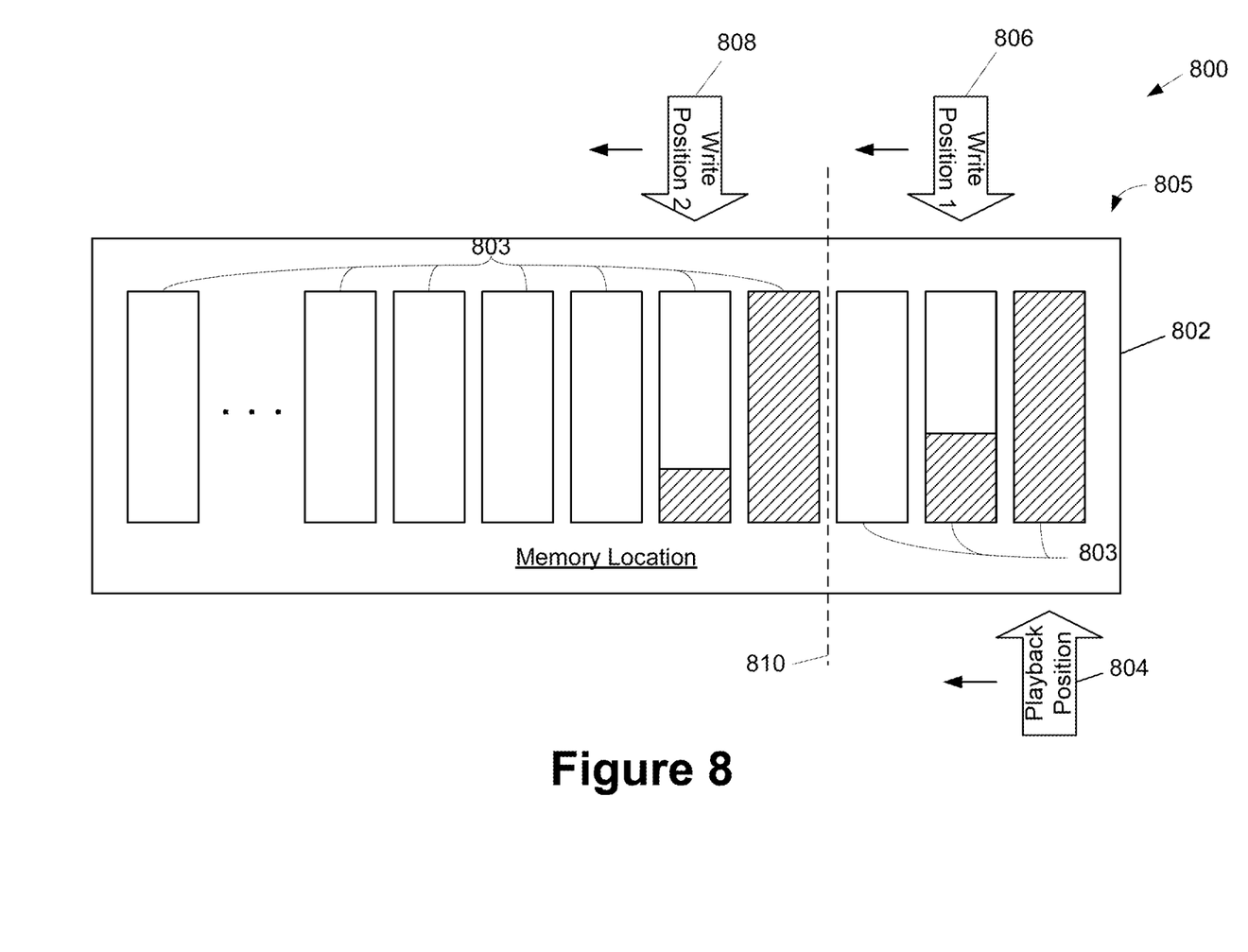
FIG. 8 is a block diagram illustrating the stitching and playback of the process flow of FIG. 7.

FIG. 8 is a block diagram 800 illustrating the stitching and playback of the process flow 700. The block diagram 800 shows a memory location 802 that may be a memory location in the data store 135 of the user device 102. The memory location 802 comprises a plurality of logical positions 803, where each logical position 803 may contain one or more data units. The memory location 802 and logical memory positions 803 may correspond to any suitable denomination of memory including, for example, files, data blocks, directories, etc. When the user device 102 receives the stream of the opening portion 303 of the content item, it progressively writes the received opening portion starting at a logical beginning 805 of the memory location 802. A marker 806 indicates a write position of the first stream. The write position may begin at the logical beginning 805 of the memory location 802, and proceed, for example, to the left as logical positions 803 are filled. In the example illustrated by FIG. 8, the first logical position 803 is filled, while the next logical position 803 is partially filled. Playback of the content item may also begin at the logical beginning 805 of the file, as indicated by playback position marker 804. As playback progresses, the playback position tracks to the left, as indicated in FIG. 8.

When the stream of the remainder portion 304 is received, the client 133 begins progressively writing the remainder portion 304 at the memory location 802, albeit starting at an offset position 810 offset from the logical beginning 805 of the memory location. The number of digital units between the offset position 810 and the logical beginning 805 of the memory location 802 (e.g., the offset) may correspond to the number of digital units between the breakpoint 302 and the chronological beginning 301 of the content item 300. For example, when stream of the opening portion 303 concludes, the digital units 306 making up the opening portion 303 may extend from the logical beginning of the memory location 805 to the offset position 810. The playback position 804 may progress across then offset position 810 to play the remainder 304 of the content item 300. The value of the offset may be a standard number of digital units known to the client 133. In some example embodiments, the client 133 receives the value of the offset with either the stream of the opening portion or the stream of the remainder portion. In some embodiments, a header or other metadata is placed at the logical beginning 805 of the memory location 802, meaning that the offset between the position 810 and the logical beginning 805 of the memory location 802 may correspond to the number of digital units between the breakpoint 302 and the chronological beginning 301 of the content item 300 plus an offset for the header.

Figure 9:
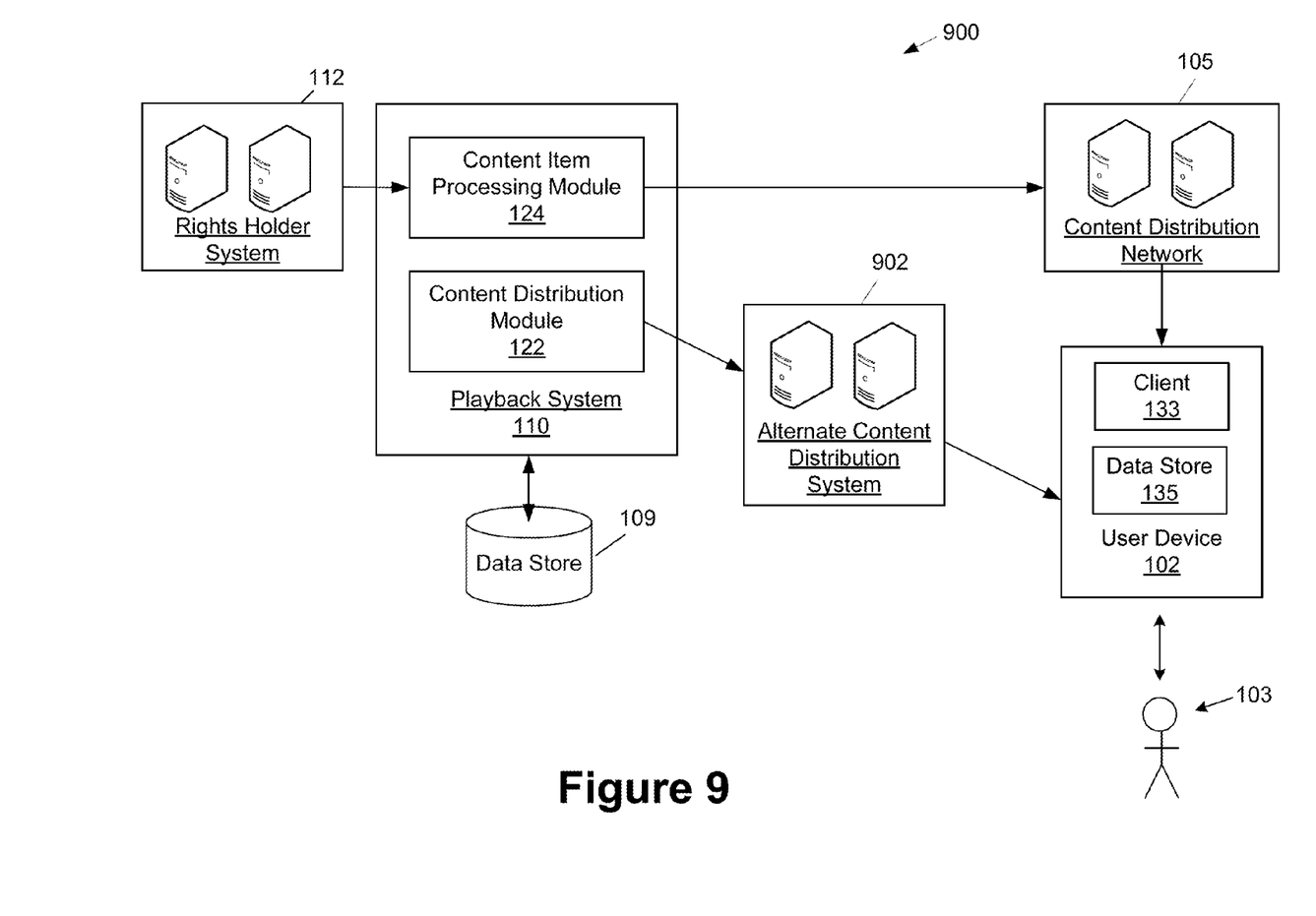
FIG. 9 is a block diagram of one example embodiment of a process for receiving content items and providing the content items to content provider service users that utilizes an alternate content distribution system.

FIG. 9 is a block diagram 900 of one example embodiment of a process for receiving content items and providing the content items to content provider service users that utilizes an alternate content distribution system 902. For example, the remainder portion of content items may be provided by the alternate content distribution system 902. As described herein, the remainder portion of content items need not be streamed to the user 103 as quickly as the opening portion. Accordingly, the alternate content distribution system 902 may be a slower, and therefore less expensive, alternative to the content distribution network 105. For example, the alternate content distribution system 902 may not include mirror sites and/or may include fewer or less well-distributed mirror sites.

Figure 10:
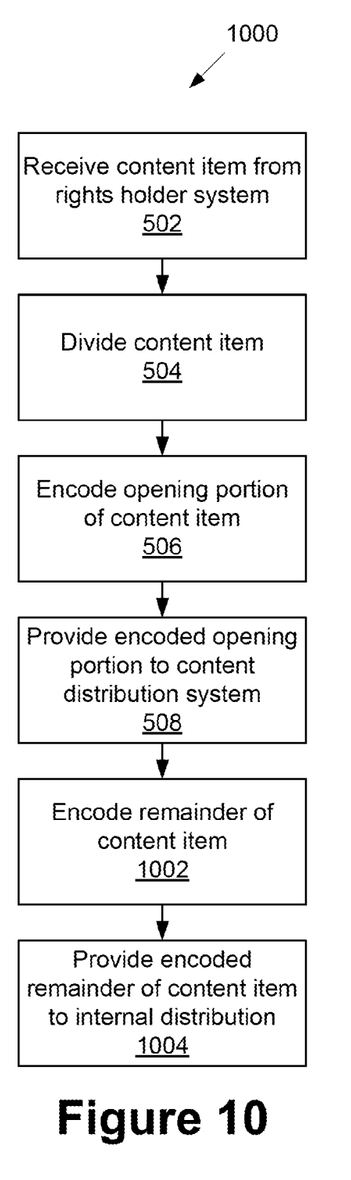
FIG. 10 is a flow chart illustrating one example embodiment of a process flow for receiving and processing content items in conjunction with the block diagram of FIG. 9.

FIG. 10 is a flow chart illustrating one example embodiment of a process flow for receiving and processing content items in conjunction with the block diagram 900. The process flow 1000 may be executed in a manner similar to that described above with respect to the process flow 500. A content item is received from a rights holder system 112 at 502. The content item is divided into an opening portion and a remainder portion at 504. At 506, the opening portion is encoded and provided to the content distribution network (508). Subsequently, the remainder portion is also encoded at 1002 and provided to the alternate content distribution system 902 at 1004.

Figure 11:
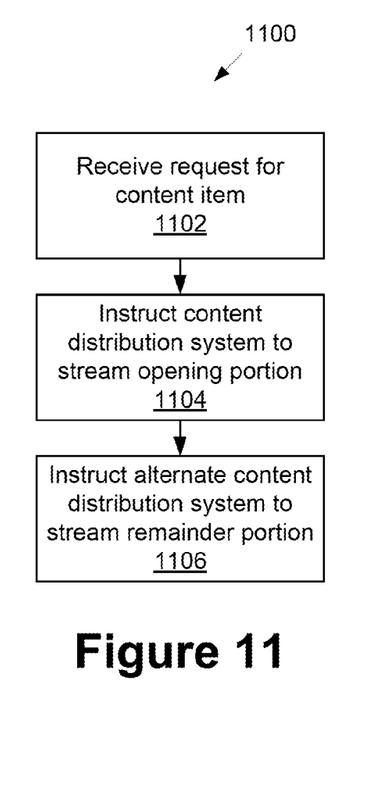
FIG. 11 is a flow chart illustrating one example embodiment of a process flow for receiving and processing content item requests in conjunction with the system of FIG. 9.

FIG. 11 is a flow chart illustrating one example embodiment of a process flow 1100 for receiving and processing content item requests in conjunction with the system 900. At 1102, the playback system 110 (e.g., the content distribution module 122 thereof) may receive a request for a content item. At 1104, the content distribution module 122 instructs the content distribution network 105 to begin streaming an opening portion of the requested content item to the requesting user device 102. At 1106, the content distribution module 122 instructs the alternate content distribution system 902 to begin streaming a remainder portion of the requested content item to the requesting user device 102. The user device 102 (e.g., the client 133 thereof) may stitch the opening and remainder portions and initiate playback as described herein.

Figure 12:
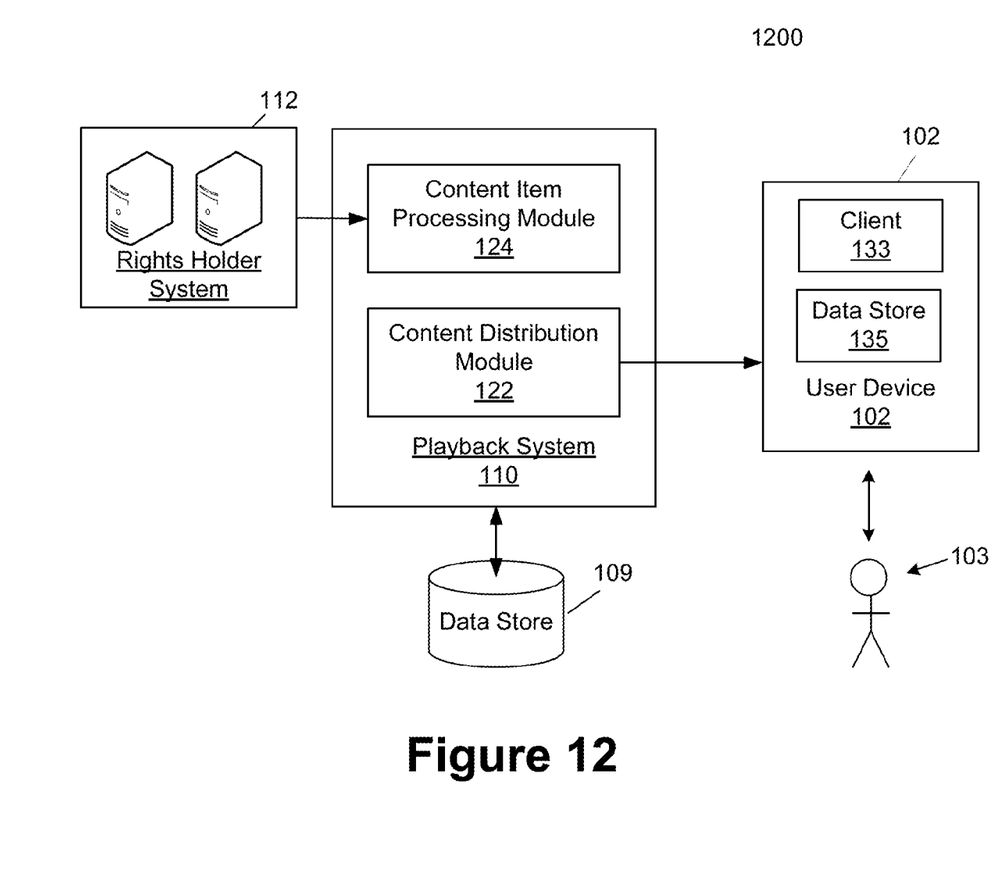
FIG. 12 is a block diagram of one example embodiment of a process for providing content items to content provider service users without utilizing a content distribution network.
Figure 13:
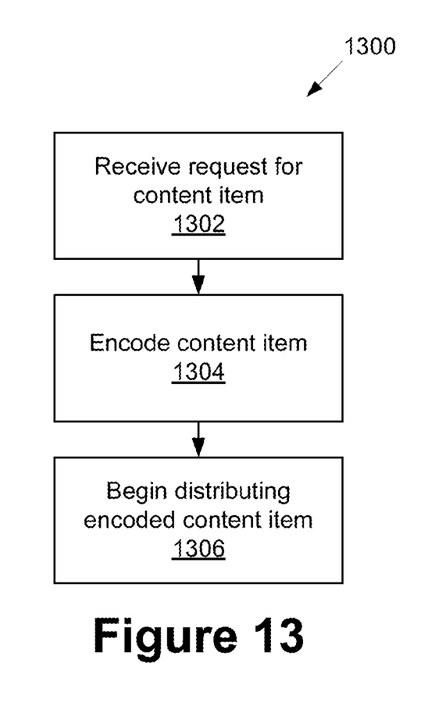
FIG. 13 is a flow chart illustrating one example embodiment of a process flow for providing content items according to the block diagram of FIG. 12.

FIG. 12 is a block diagram of one example embodiment of a process for providing content items to content provider service users without utilizing a content distribution network 105. FIG. 13 is a flow chart illustrating one example embodiment of a process flow 1300 for providing content items according to the block diagram of FIG. 12. At 1302, the playback system 110 receives a request for a content item. At 1304, the playback system 110 encodes the content item. For example, when content items are received from rights holder system 112, the playback system 110 stores the content items at the data store 109 without completing the encoding process. Instead, encoding may be performed on demand at 1304. At 1306, the playback system 110 may begin streaming the now-encoded content item to the requesting user device 102.

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to example embodiments of the invention by way of illustration only. Alternative example embodiments of the structures and methods disclosed here may be employed without departing from the principles of what is claimed.

Any patent, publication, or other disclosure material, in whole or in part, that is said to be incorporated by reference herein is incorporated herein only to the extent that the incorporated materials do not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Reference in the specification to "one example embodiment," "various example embodiments," or to "an example embodiment" means that a particular feature, structure, or characteristic described in connection with the example embodiments is included in at least one example embodiment of the invention. The appearances of the phrase "in one example embodiment" or "a preferred example embodiment" in various places in the specification are not necessarily all referring to the same example embodiment. Reference to example embodiments is intended to disclose examples, rather than limit the claimed invention.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of actions (instructions) leading to a desired result. The actions are those requiring physical manipulations of physical quantities. Usually, though not necessarily, these quantities take the form of electrical, magnetic or optical signals capable of being stored, transferred, combined, compared and otherwise manipulated. It is convenient, at times, principally for reasons of common usage, to refer to these signals as bits, values, elements, symbols, characters, terms, numbers, or the like. Furthermore, it is also convenient, at times, to refer to certain arrangements of actions requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method actions. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred example embodiment and several alternate example embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A playback system for providing content items to a user device, the playback system comprising:
a processor;
a memory device in communication with the processor, wherein the memory device comprises instructions thereon that, when executed by the processor, cause the playback system to:
divide a first content item into an opening portion and a remainder portion, wherein the opening portion begins at a chronological beginning of the first content item and ends a first number of digital units from the chronological beginning of the first content item;
encode the opening portion according to a first encoding format to generate a first encoded opening portion;
send the first encoded opening portion to a content distribution system remote from the playback system;
estimate a time to encode the remainder portion according to the first encoding format;
estimate a delay between beginning of a streaming of a first encoded remainder portion and receiving a resulting stream at the user device; and
select the first number of digital units, wherein the first number of digital units is equivalent to or greater than an estimated delay between a receipt of the stream of the opening portion from the content distribution system to the user device and a receipt of the stream of the remainder portion;
receive a request for the first content item from a user device; and
in response to the request:
send, to the content distribution system, an instruction to stream the first encoded opening portion to the user device;
encode the remainder portion according to the first encoding format to generate the first encoded remainder portion; and stream the first encoded remainder portion from the playback system to the user device.

2. The system of claim 1, wherein the first number of digital units from the chronological beginning of the first content item corresponds to about thirty (30) seconds of a playback time of the first content item.

3. The system of claim 1, wherein the memory device further comprises instructions thereon that, when executed by the processor, cause the playback system to:
receive a second request for the first content item from a second user device, wherein the second request indicates a second encoding format;
send, to the content distribution system, a second instruction to stream a second encoded opening portion to the second user device;
encode the remainder portion according to the second encoding format to generate a second encoded remainder portion; and
stream the second encoded remainder portion to the second user device.

4. The system of claim 1, wherein the memory device further comprises instructions thereon that, when executed by the processor, cause the playback system to, in response to the request, provide the user device with an indication of the first number of digital units.

5. The system of claim 1, wherein the memory device further comprises instructions thereon that, when executed by the processor, cause the playback system to:
divide a plurality of content items resulting in, for each of the plurality of the content items, an opening portion beginning at a chronological beginning of the content item and ending a predetermined number of digital units from the chronological beginning of the content item and a remainder portion;
encode each of the resulting opening portions according to the first encoding format; and send each of the resulting opening portions to the content distribution system.

6. The system of claim 1, wherein the memory device further comprises instructions thereon that, when executed by the processor, cause the playback system to:
encode an opening portion of a second content item according to the first encoding format to generate a third encoded opening portion of the second content item;
send the third encoded opening portion to the content distribution system; receive a second request for the second content item from the user device;
in response to the second request:
send, to the content distribution system, an instruction to stream the first encoded opening portion of the second content item to the user device;
encode a remainder of the second content item according to the first encoding format to generate a first encoded remainder portion of the second content item; and
stream the first encoded remainder portion of the second content item to the user device.

7. A computer-implemented method for providing content items to a user device, the method comprising:
dividing, by a playback system, a first content item into an opening portion and a remainder portion by a computer system, wherein the opening portion begins at a chronological beginning of the first content item and ends a first number of digital units from the chronological beginning of the first content item, and wherein the playback system comprises at least one processor and associated memory;
encoding, by the playback system, the opening portion according to a first encoding format to generate a first encoded opening portion;
sending, by the playback system, the first encoded opening portion to a content distribution system remote from the playback system;
estimating, by the playback system, a time to encode the remainder portion according to the first encoding format;
estimating, by the playback system, a delay between beginning of a streaming of a first encoded remainder portion and receiving a resulting stream at the user device; and
selecting, by the playback system, the first number of digital units, wherein the first number of digital units is equivalent to or greater than an estimated delay between a receipt of the stream of the opening portion from the content distribution system to the user device and a receipt of the stream of the remainder portion;
receiving, by the playback system, a request for the first content item from a user device; and
in response to the request:
sending, to the content distribution system and by the playback system an instruction to stream the first encoded opening portion to the user device;
encoding, by the playback system, the remainder portion according to the first encoding format to generate the first encoded remainder portion; and
streaming, from the playback system, the first encoded remainder portion.

8. A playback system for providing content items to a user device, the system comprising:
a processor;
a memory device in communication with the processor, wherein the memory device comprises instructions thereon that, when executed by the processor, cause the playback system to:
divide a first content item into an opening portion and a remainder portion, wherein the opening portion begins at a chronological beginning of the first content item and ends a first number of digital units from the chronological beginning of the first content item;
encode the opening portion according to a first encoding format to generate a first encoded opening portion;
send the first encoded opening portion to a content distribution system remote from the playback system;
estimate a time to encode the remainder portion according to the first encoding format;
estimate a delay between beginning of a streaming of a first encoded remainder portion and receiving a resulting stream at the user device; and
select the first number of digital units, wherein the first number of digital units is equivalent to an estimated delay between a receipt of the stream of the opening portion from the content distribution system to the user device and a receipt of the stream of the remainder portion;
receive a request for the first content item from a user device, wherein the request indicates the first encoding format; and
in response to the request:
send, to the content distribution system, an instruction to stream the encoded opening portion to the user device; and
stream a first encoded remainder portion to the user device, wherein the first encoded remainder portion is also encoded according to the first encoding format.

* * * * *